United States Patent
Strong et al.

(10) Patent No.: US 6,335,931 B1
(45) Date of Patent: Jan. 1, 2002

(54) SYSTEM FOR SYNCHRONIZING NETWORK DATA TRANSMISSION AND COLLECTION

(75) Inventors: Stephen H. Strong, Fremont; Tor A. Sundsbarm, San Jose, both of CA (US)

(73) Assignee: Finisar Corporation, Sunnyvale, CA (US)

(*) Notice: Subject to any disclaimer, the term of this patent is extended or adjusted under 35 U.S.C. 154(b) by 0 days.

(21) Appl. No.: 09/087,379

(22) Filed: May 29, 1998

(51) Int. Cl.[7] .................................................. H04J 3/06
(52) U.S. Cl. ........................ 370/390; 370/503; 370/507
(58) Field of Search ................................. 370/389, 390, 370/475, 503, 507; 327/144, 146, 147; 714/26, 39

(56) References Cited

U.S. PATENT DOCUMENTS 4,282,493 A * 8/1981 Moreau .......................... 331/2
4,864,559 A * 9/1989 Perlman ....................... 370/60
5,696,701 A * 12/1997 Burgess et al. ........... 364/551.01

* cited by examiner

*Primary Examiner*—Melvin Marcelo
(74) *Attorney, Agent, or Firm*—Fenwick & West LLP

(57) ABSTRACT

A system for synchronizing data packet collection and transmission on multiple segments of a local area network ("LAN") or a wide area network ("WAN") using a common clock to generate time stamps placed on the data packets by all peripheral network devices. The common clock is located on a network analyzer device which acts as the "master" to other "slave" peripheral network devices which are driven by the common clock and coupled to the master device in a master-slave configuration. The system also synchronizes the initialization of data packet transmission and/or collection on multiple peripheral network devices by using a common industry standard architecture ("ISA") address for all devices involved in the data transmission and/or collection.

11 Claims, 2 Drawing Sheets

SYSTEM FOR SYNCHRONIZING NETWORK DATA TRANSMISSION AND COLLECTION

BACKGROUND OF THE INVENTION

1. Field of the Invention

The present invention relates generally to network analysis, and more particularly to a system for generating accurate time stamps for placement on data packets transmitted into, and collected from, local area networks ("LAN") and wide area networks ("WAN").

2. Description of the Related Art

The analysis and monitoring of LANs and WANs require tools that can collect and disassemble data packets transmitted through many different protocols or formats across a network. To ensure that digital data being transmitted on a network arrives at its intended destination, the data is packaged with header and trailer information which is specific to the type of protocol being used. In order to analyze a network, analysis and monitoring tools need access to the stream of data traveling across the network. Such access points take several forms, such as ports on switches, hubs, and routers, or network interface devices commonly found in personal computers or workstations. Network analysis and monitoring tools connect into the network through these ports or network interfaces.

Network analysis and monitoring tools operate in two principal modes: (1) data collection mode for analysis; and (2) data transmission mode for testing network element behavior based on well-known traffic. In the data collection mode, data collected from a single collection point is disassembled and analyzed in order to determine what is happening on a single segment of the network between two network devices. However, in order to assess network behavior across a network device, such as a switch or router, or between two or more segments, data must be collected from multiple segments. The coordination of data collected from multiple segments is problematic or impossible unless the data is time stamped during transmission between various network devices. For example, to test the amount of time it takes a data packet to travel through a router—known as the "latency" of the router—the packet must be time-stamped as it enters the router and again as it exits the router. This time-stamping is only helpful if the entering time stamp is generated from a clock source which is synchronized with the clock source used to generate the exiting time stamp. Without such clock synchronization, the comparison between the time stamps is meaningless, and the accurate determination of the router latency is therefore impossible.

Time stamps on data packets derived from synchronized clocks are also useful during protocol decoding. Protocol decoding is typically accomplished by sending requests in the form of data packets from a first network device to a second network device, and then sending an acknowledgment back from the second device to the first device. Both the request packet and the acknowledgment packet will get a time stamp from the first and second devices. Over time, the request and acknowledgment packets will accumulate in a local cache. If the time stamps are not accurate, i.e., if they are not derived from clocks on both the first and second network devices that are synchronized, then the protocol determination is impossible since the data read from the cache is not accurate. Simply put, it is impossible to decode the protocol without knowing when in time the request packet enters and exits each device relative to when in time the acknowledgment packet enters and exits each device.

Time stamps on data packets derived from synchronized clocks are also useful for trigger operations. During collection of data packets, a filter is typically used to capture certain types of data packets by defining the filter to recognize specific types of packets or portions of packets. A "trigger" is an input condition which further limits the parameters of this filter. For example, a trigger operation can be specified to instruct a filter to capture packets only until a predetermined percentage of memory is full. If filters on numerous analyzer devices located throughout a network have the same trigger operation, then the time stamps on the data packets captured as a result of the filtering must be accurate in order for the information obtained to be meaningful. For example, if the trigger operation described above is used for a first analyzer device, then other analyzer devices in the network must have clocks which are synchronized with the clock of the first analyzer device so that they (1) initiate the capturing packets sequence at precisely the same time as the other devices and (2) capture packets only for the specified amount of time from the time the trigger begins, and no longer. This is important so that the captured data is not overwritten in memory.

A current problem associated with synchronizing clocks from which time stamps on data packets are derived is known as "clock drift." Clock drift refers to the gradual change in the zero reading of a clock occurring naturally over time, causing two clocks initially synchronized to eventually diverge and lose their synchronization. A current system for handling clock drift problems uses low tolerance clocks, where the maximum difference between two low tolerance clocks is very low, such as 2.5 parts per million ("PPM"). However, due to its high cost, this is not a very practical solution for peripheral network devices, or other devices which may require tens or hundreds of units installed on a network. Moreover, the clocks of this system still drift to a noticeable difference over time.

Thus, there is a need for a system for synchronizing clocks on devices in a network so that time stamps placed on data packets transmitted into and collected from multiple segments on that network are synchronized with respect to each other. Furthermore, there is a need for a system for synchronizing the initialization of data packet collection on multiple peripheral network devices during the use of trigger operations.

SUMMARY OF THE INVENTION

In accordance with the present invention, there is provided a system for generating accurate time stamps on data packets traveling on multiple segments of a LAN or WAN through the use of a common clock for all peripheral network devices. There is also provided a system for synchronizing the initialization of data packet transmission and collection on multiple peripheral network devices through the use of a common industry standard architecture ("ISA") address for all devices involved in the data collection.

In particular, the system of the present invention includes at least two peripheral network devices coupled in a master-slave relationship so that the clock source of the master device is used by all the slave devices coupled thereto. In this way, the time stamps placed by the devices on collected data packets are accurate and meaningful since they are all derived from the same clock source.

More specifically, the present invention includes two peripheral network devices, each having its own clock source. One of the peripheral network devices acts as a master device and the other acts as a slave device in a master-slave relationship. This relationship is achieved by connecting a master connector on the designated master device to a slave connector on the designated slave device. The master device sends a clock signal whose frequency is one-half the frequency of the master clock source to the slave device. The slave device receives the one-half frequency clock signal from the master device, doubles the frequency of the clock signal, and uses the master device clock source to drive its time-stamp counters and all system functions. The presence of the cable on the master connector of the master device causes the master device to use its own internal clock source. The presence of the cable on the slave device disables the clock source on the slave device an causes the slave device to use the clock source of the master device to drive all its system functions.

In another aspect of the present invention, at least two peripheral network devices are connected so that all connected devices will capture data packets using the same trigger operation.

In yet another aspect of the invention, at least two peripheral network devices contain a programmable common address register for storage of a common address. This allows a LAN device, such as a personal computer ("PC"), to send a signal at the same time to all the peripheral network devices in a LAN instructing the peripheral network devices to begin collecting data, thus synchronizing the time at which data collection initiates.

The features and advantages described in the specification are not all-inclusive, and many additional features and advantages will be apparent to one of ordinary skill in the art in view of the drawings, specification, and claims hereof.

DETAILED DESCRIPTION OF THE INVENTION

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
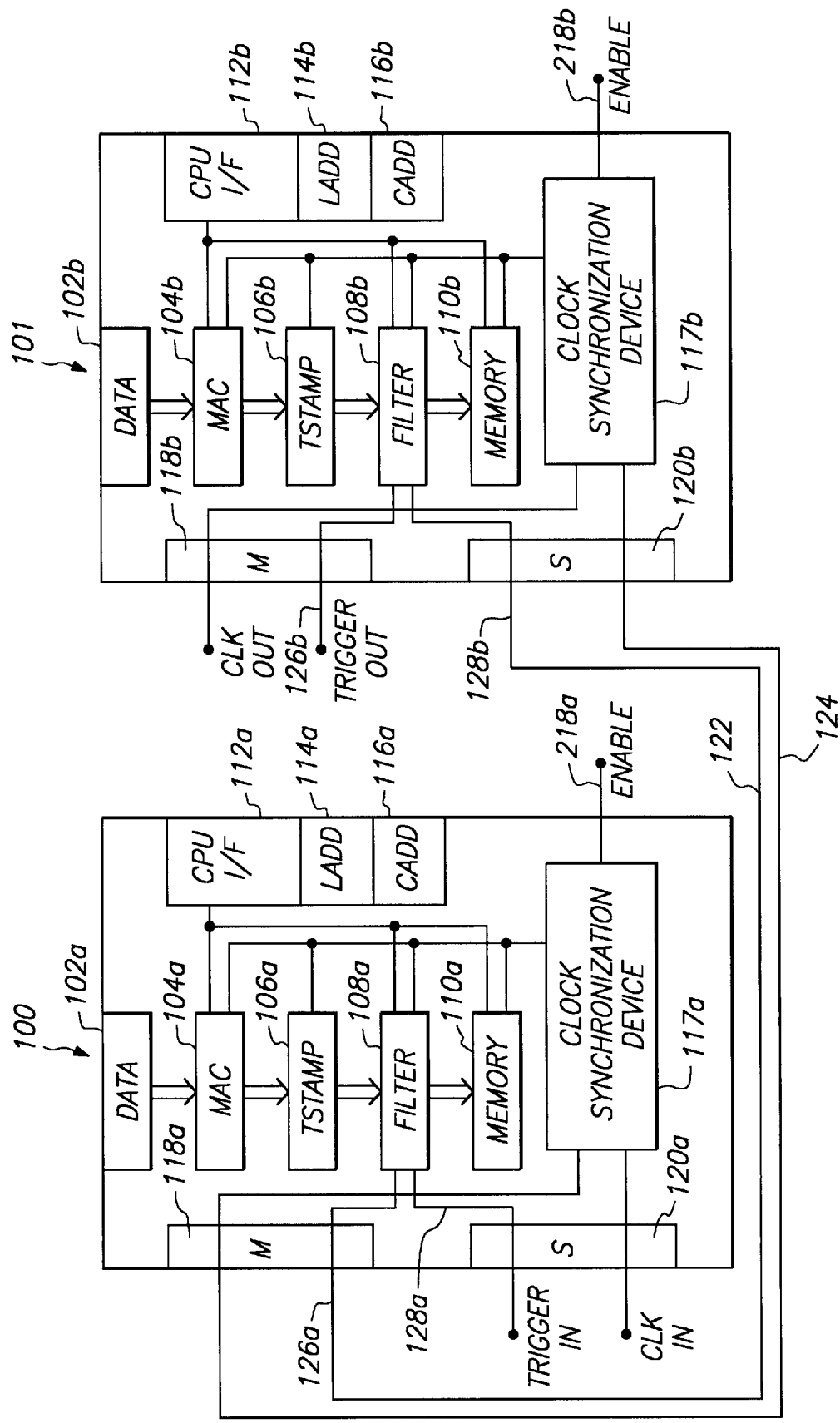
FIG. 1 is a block diagram of two peripheral network devices containing clock synchronization devices and common address registers according to the present invention.

Referring now to FIG. 1, there is shown a block diagram of two peripheral network devices 100, 101 coupled in a manner according to the present invention. Each device 100, 101 may be located on a separate network device in a LAN or WAN, or at the entrance and exit, respectively, of the same network device. Each network analyzer device 100, 101 comprises a data input device 102a, 102b, a medium access control ("MAC") device 104a, 104b, a time stamping device 106a, 106b, a filtering device 108a, 108b, a memory device 110a, 110b, a central processing unit ("CPU") interface 112a, 112b, a local address register ("LADD") 114a, 114b, a common address register ("CADD") 116a, 116b, and a clock synchronization device 117a, 117b. Also included on each network analyzer device 100, 101 is a master port 118a, 118b and a slave port 120a, 120b. In a preferred embodiment, the peripheral network devices 100, 101 are Century Media Module 2 analyzer cards manufactured by Shomiti Systems, Inc., of San Jose, Calif.

The data input device 102a, 102b intercepts a data packet traveling along a data path of a network and copies it as a captured data packet without interrupting the flow of the original data packet to its intended destination. This is accomplished by a conventional data packet capture software routine executed by the CPU of a conventional computer system. The data input device 102a, 102b then sends the received data packets to the MAC device 104a, 104b.

The MAC device 104a, 104b locates the data in the "medium access sublayer"—as the layer is conventionally called according to the OSI standard—of the data packet. The MAC device 104a, 104b is a conventional integrated circuit that decodes the medium access sublayer of the captured data packet. In a preferred embodiment, the MAC device 104a, 104b is the SEEQ 80C300 semiconductor chip. Once the MAC device 104a, 104b locates the "medium access sublayer" data it sends the located information to the time stamping device 106a, 106b.

The time stamping device 106a, 106b is a conventional large counter that starts counting when the network analyzer device 100, 101 is initiated or "armed." The time stamping device 106a, 106b is readable when the data packets are received into the memory device 110a, 110b, at which time the captured data packets are time stamped for later use in LAN analysis and configuration management.

The filtering device 108a, 108b is configured to recognize certain types of packets or portions of packets. In a preferred embodiment, the filtering device 108a, 108b is comprised of conventional filter logic circuitry. The memory device 110a, 110b stores the data packets captured according to the configuration of the filtering device 108a, 108b. The memory device 110a, 110b is preferably any type of conventional random-access memory ("RAM"). The CPU interface 112a, 112b couples the peripheral network devices 100, 101 to a conventional central processing unit (CPU) to allow operation of the devices 100, 101 to be controlled by software and the like.

The LADD 114a, 114b of each of the peripheral network devices 100, 101 contains the ISA address which a network device, such as a PC, designates in order to communicate with the devices 100, 101. Typically, both of the addresses stored in the LADDs 114a, 114b of both devices 100, 101 have to be written-to at the same time in order to get both devices 100, 101 to start collecting data at the same time. In a preferred embodiment of the present invention, however, a CADD 116a, 116b stores a common address in all of the devices 100, 101. This common address is created through the use of a conventional programmable register which allows the same data value to be written to each CADD 116a, 116b of each device 100, 101. Thus, the PC is able to send a signal to both of the peripheral network devices 100, 101 at the same time by designating a single common address value. This advantageously allows the PC to send one signal instructing all of the peripheral network devices 100, 101 to start collecting data at the same time, and eliminates the time delay problems inherent in previous solutions which require separately addressing each card.

In a preferred embodiment, a trigger operation is specified on the filtering devices 108a, 108b. The trigger operation preferably instructs the devices 100, 101 to capture data packets up to a specified amount of memory, subject to the parameters defined by the filtering device 108a, 108b. A first cable 122 connects a trigger-out pin 126a of the filtering device 108a of the first device 100 to the trigger-in pin 128b of the filtering device 108b of the second device 101. In this way, the trigger operation specified in one device 100, 101 is the same as the trigger operation specified in-the other device 101, 100. In a preferred embodiment, either device 100, 101 can act as the generator of the trigger operation, and conventional software located on a CPU is used to control which device 100, 101 will be the trigger generator. For the trigger operation described above, the second device 101 is also prevented from overwriting its memory with captured packets since it is subject to the trigger operation specified in the first device 100. Thus, the packets captured by the first device 100 and the packets captured by the second device 101 will provide useful information for analyzing the network even when subject to a trigger operation.

As data packets travel between devices on a LAN or WAN, time stamps are placed on the data packets by the time stamping devices 106a, 106b of the peripheral network devices 100, 101. The time stamps are generated by the clock synchronization devices 117a, 117b. In the preferred embodiment of the present invention, two or more peripheral network devices 100, 101 are coupled to each other so that the clock synchronization device 117a of one network analyzer device 100 is used as the common clock source for the remaining peripheral network devices 100, 101. As shown in FIG. 1, the clock synchronization device 117a of the first device 100 is physically coupled, via a second cable 124, to the clock synchronization device 117b of the second device 101. In particular, this coupling is achieved by coupling a CLOCK-OUT pin 220a of the master port 118a of the first device 100 to a CLOCK-IN pin 222b of the slave port 120b of the second device 101. The second peripheral network device 101 disables its own clock synchronization device 117b when it senses a cable 124 on the slave port 120b. In this configuration, the clock synchronization device 117a of the first device 100 supplies the clock source for both the first and second devices 100, 101, and the clock source located on the clock synchronization device 117b of the second device 101 is disabled. As a result, the two peripheral network devices 100, 101 are physically coupled in a master-slave relationship, where the first device 100 acts as the "master" and the second device 101 acts as the "slave." Thus, time stamps can be placed on the data packets by different time stamping devices 106a, 106b driven by the same clock source. This advantageously avoids the problems associated with initially synchronizing, and maintaining synchronization of, two separate clock sources.

Figure 2:
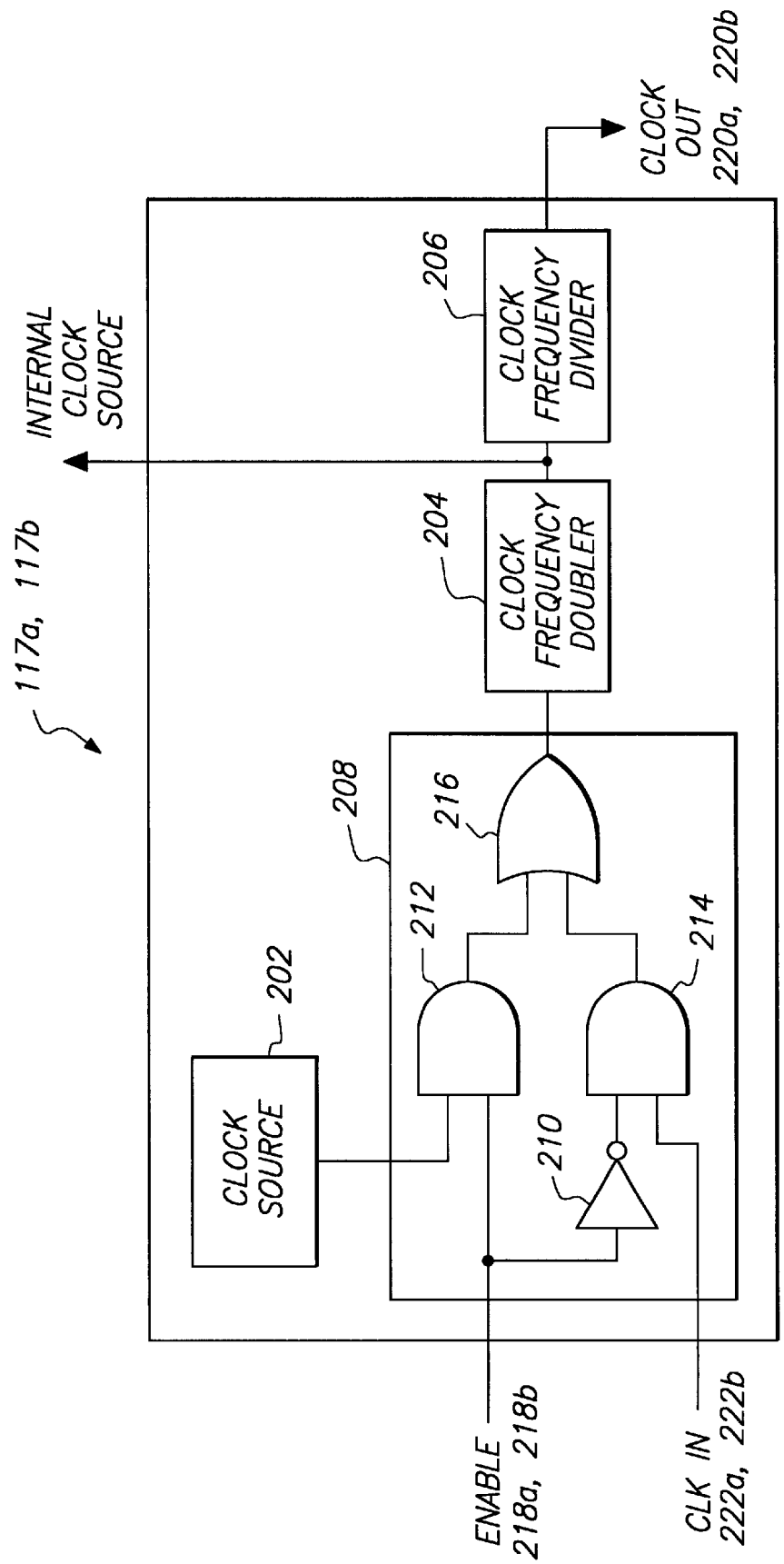
FIG. 2 is a block diagram of a clock synchronization device according to the present invention.

There is shown in FIG. 2 a block diagram of a clock synchronization device 117a, 117b according to the present invention. Each of the clock synchronization devices 117a, 117b comprises a clock source 202, a clock frequency doubler 204, a clock frequency divider 206, and a switch 208. The switch 208 is coupled to an ENABLE pin 218a, 218b in the slave port 120a, 120b.

The clock source 202 outputs a clock signal at a frequency which is one-half the frequency required to drive all system functions of the network analyzer device 100, 101. The clock doubler 204 receives and doubles the frequency of the clock signal for use as an internal clock signal for the network analyzer device 100, 101 on which the clock doubler 204 is located. The clock doubler 204 doubles the frequency of the clock signal regardless of whether the signal comes from the clock source 202 of the same clock synchronization device 117a or the clock source 202 of a clock synchronization device 177b on another network analyzer device 101. The clock frequency divider 206 divides the frequency of the clock signal by one-half and is available at the clock out pin 220a, 220b for use by other peripheral network devices 100, 101. In a preferred embodiment, the clock frequency doubler 204 is a conventional phase-locked loop ("PLL") circuit, and the clock frequency divider 206 is comprised of conventional logic circuitry.

In a preferred embodiment, the switch 208 is a conventional multiplexer consisting of an inverter 210, two logic AND gates 212, 214, and an OR gate 216. In operation, if the second cable 124 is coupled to the CLOCK-IN pin 222a, 222b of the clock synchronization device 117a, 117b, the ENABLE pin 218a, 218b is grounded and the network analyzer device 100, 101 uses the clock source 202 from another network analyzer device 101, 100. As illustrated in FIG. 1, the second cable 124 is coupled to the CLOCK-IN pin 222b of the clock synchronization device 117b of the second device 101 and therefore the ENABLE pin 218b of the second device 101 is grounded, causing the switch 208 to transmit the clock source of the first device 100 to the second device 101.

When there is no cable coupled to the CLOCK-IN pin 222a, 222b of the network analyzer device 100, 101, the ENABLE pin 218a, 218b is high and the network analyzer device 100, 101 uses its own clock source 202 located on its own clock synchronization device 117a, 117b. This is the case illustrated by the first network analyzer device 100 in FIG. 1.

In a preferred embodiment, the one-half frequency clock source 202 is used to reduce electromagnetic interference (EMI) during transmission of the clock signal between peripheral network devices 100, 101. One skilled in the art will recognize that the clock source 202 of the clock synchronization device 117a, 117b could be substituted by a clock source which outputs a clock signal at the frequency required to drive all system functions on the device 100, 101, and the clock frequency doubler 204 and divider 206 could be omitted, without hindering the operation of the present invention.

Additional devices may be coupled in a cascading or daisy-chain fashion by coupling the CLOCK-OUT pin 220b of the second device 101 to the CLOCK-IN pin of a third device, and so on, in the same manner that the first device 100 is coupled to the second device 101. Thus, the additional devices will act as further slave devices and be driven by the clock source 202 of the first, "master" device 100. In this way, all the time stamping devices on all of the devices in the daisy chain will be synchronized.

From the above description, it will be apparent that the invention disclosed herein provides a novel and advantageous system for synchronizing network data transmission and collection. The foregoing discussion discloses and describes merely exemplary methods and embodiments of the present invention. As will be understood by those familiar with the art, the invention may be embodied in other specific forms without departing from the spirit or essential characteristics thereof. For example, the clock source may be supplied to all the peripheral network devices at fall frequency. In another implementation, a bus or star coupling between peripheral network devices may be used instead of a cascading coupling. Accordingly, the disclosure of the present invention is intended to be illustrative, but not limiting, of the scope of the invention, which is set forth in the following claims.

What is claimed is:

1. A system for generating synchronized time stamps from multiple network devices each having a separate clock source, the system comprising:

a first network peripheral device having a first clock source for generating a clock signal; and a second network peripheral device having a second clock source for generating a second clock signal and having a time stamp generator for selectively using the first clock signal to generate time stamps, the second clock source being disabled and the second network peripheral device receiving a clock signal from the first clock source in response to the second network peripheral device being coupled to the first network peripheral device in a master-slave relationship in which the first network peripheral device is the master and the second network peripheral device is the slave.

2. The system of claim 1, wherein the first network peripheral device further comprises a first filter for selecting data packets based on pre-selected criteria; and the second network peripheral device further comprises a second filter, coupled to the first filter when the second network peripheral device is a slave, for selecting data packets based on the same pre-selected criteria as that of the first filter.

3. The system of claim 1, wherein the first and second network peripheral devices further comprise, respectively, a first common address register and a second common address register, both the first and second common address registers for storing the same address.

4. The system of claim 3, wherein the first and second common address registers are programmable registers.

5. The system of claim 1, wherein the first clock source is located on a synchronization device comprising:

an enable input port to receive an electrical connection from the second network peripheral device;

an internal clock source to generate a first clock signal;

a clock input port to receive a second clock signal from an external clock source; and a switching device coupled intermediate the internal clock source and the clock input port for selecting the first or second clock signal responsive to the presence or absence of the electrical connection at the enable input port, the switching device having an output port for outputting the selected clock signal.

6. The system of claim 5, wherein the synchronization device further comprises:

a clock frequency multiplier coupled to the output port of the switching device to receive and increase the frequency of the selected clock signal for supply to the first network peripheral device;

a clock frequency divider coupled to receive the increased-frequency clock signal from the clock frequency multiplier and to reduce the frequency of the increased-frequency clock signal; and an output port to output the reduced-frequency clock signal for supply to the second network peripheral device.

7. A synchronization device located on a first network peripheral device for synchronizing time stamps on the first network peripheral device and at least one other network peripheral device, the synchronization device comprising:

an enable input port to receive an electrical connection from one of the at least one other network devices;

an internal clock source to generate a first clock signal for time stamping;

a clock input port to receive a second clock signal from an external clock source;

a switching device coupled intermediate the internal clock source and the clock input port for selecting the first or second clock signal responsive to the presence or absence of the electrical connection at the enable input port, the switching device having an output port for outputting the selected clock signal; and a time stamp generator for generating time stamps based upon the selected clock signal.

8. The synchronization device of claim 7, further comprising:

a clock frequency multiplier coupled to the output port of the switching device to receive and increase the frequency of the selected clock signal for supply to the first network peripheral device;

a clock frequency divider coupled to receive the increased-frequency clock signal from the clock frequency multiplier and to reduce the frequency of the increased-frequency clock signal; and an output port to output the reduced-frequency clock signal for supply to one of the at least one other network peripheral devices.

9. A system for synchronizing the initialization of the collection of data on at least two network peripheral devices comprising:

a first network peripheral device having a first common address register for storing an address; and a second network peripheral device, coupled to the first network peripheral device, having a second common address register for storing the same address as that stored in the first common address register.

10. The system of claim 9, wherein the first and second common address registers are programmable registers.

11. A time stamp synchronization system comprising:

a first network peripheral device comprising:

a first clock source for generating a first clock signal; and a first time stamp device, coupled to the first clock source, for generating a time stamp based on the first clock signal; and a second network peripheral device comprising:

a second clock source for generating a second clock signal;

a switch coupled to the first clock source and to the second clock source, to select the first clock source responsive to the second network peripheral device being coupled to first network peripheral device, or to select the second clock source responsive to the second network peripheral device not being coupled to first network peripheral device; and a second time stamp device, coupled to the switch, to receive a clock signal from the selected clock source to generate a second time stamp based on the received clock signal, such that the first time stamp and the second time stamp are both based on the first clock signal when the second network peripheral device and the first network peripheral device are coupled.

* * * * *